Aug. 8, 1950 D. W. AABEL 2,518,263
ADJUSTABLE SHAFT MOUNTING MEANS
Filed Aug. 3, 1946 2 Sheets-Sheet 1
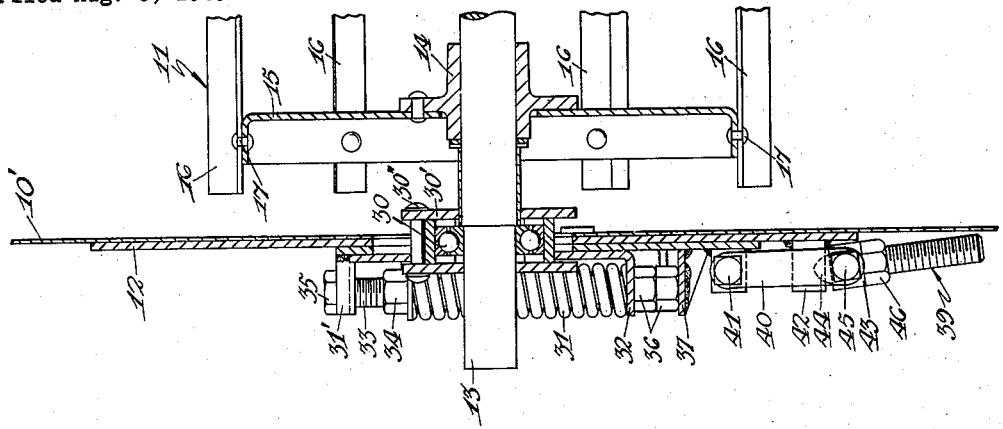
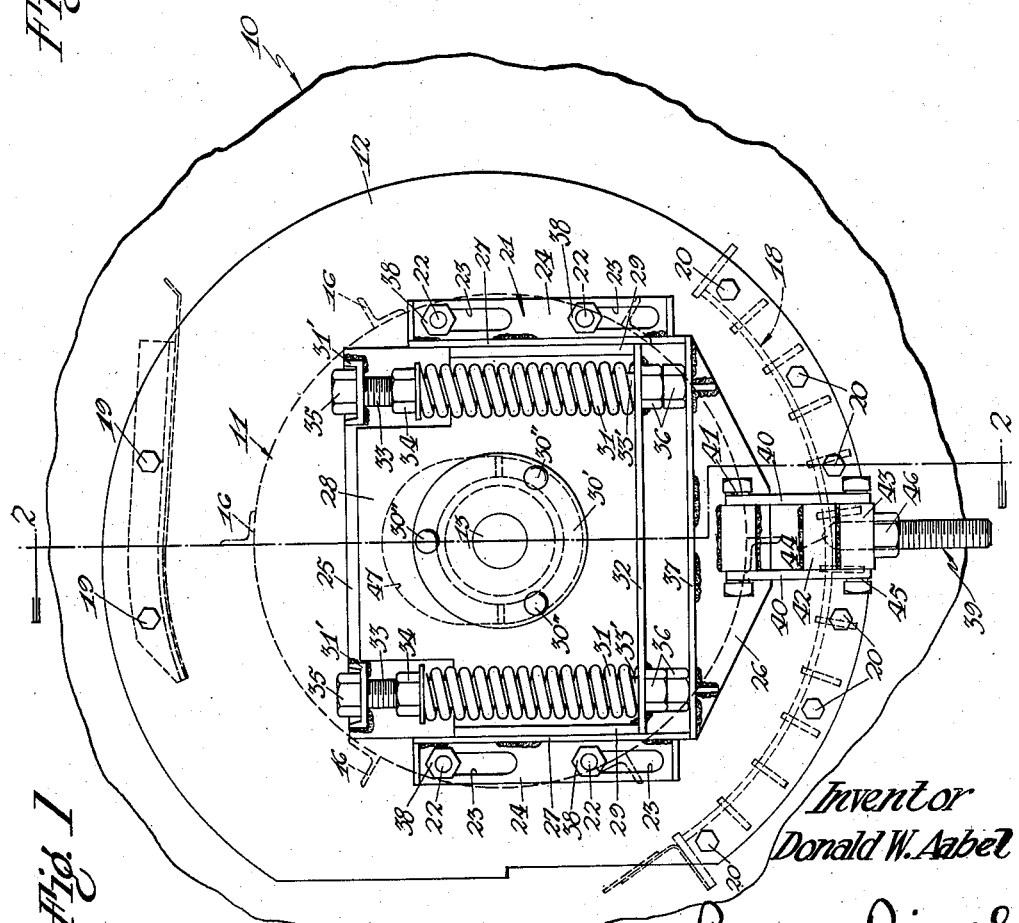
Inventor
Donald W. Aabel
By Paul O. Pippel
Atty.

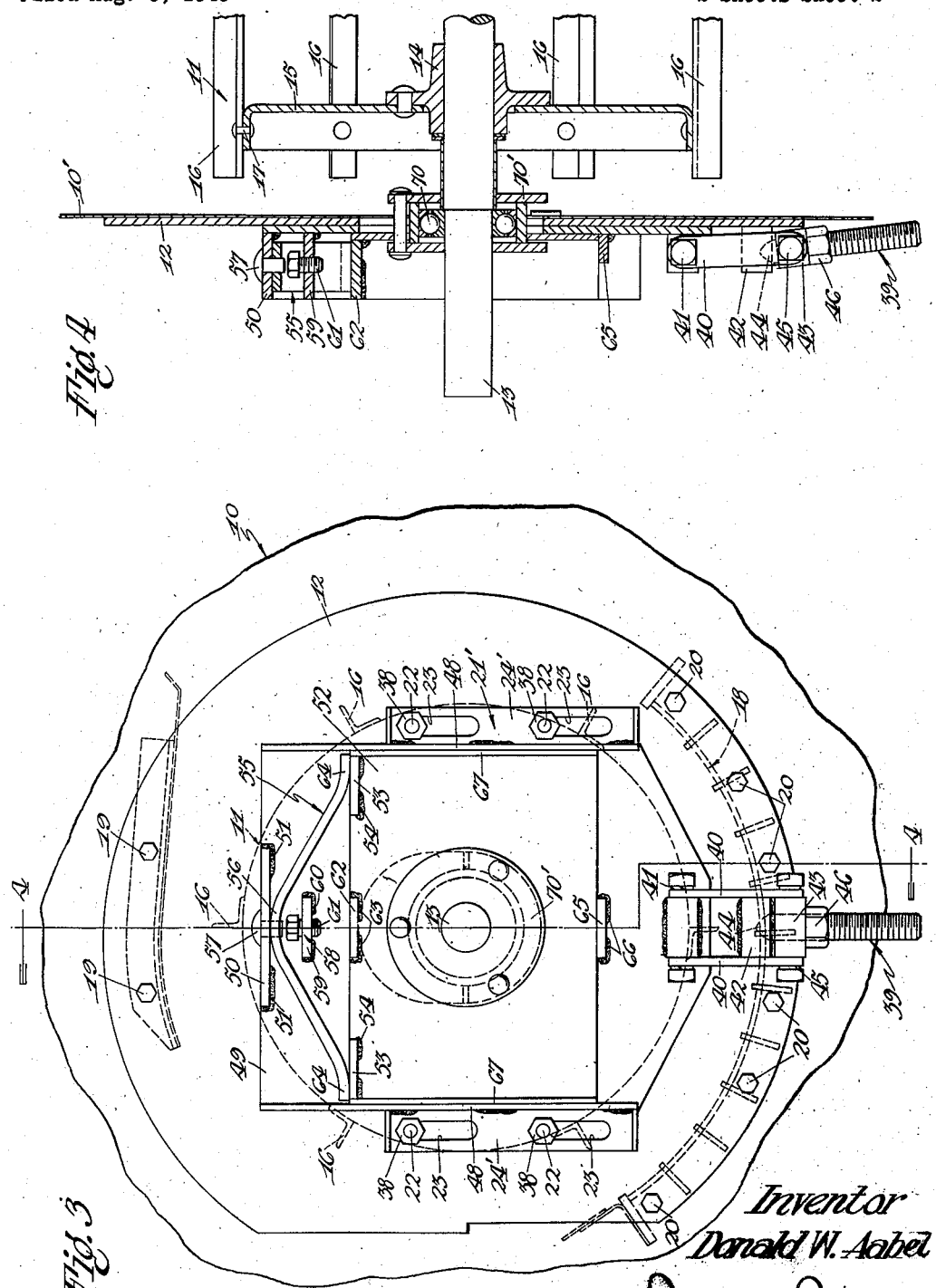

Patented Aug. 8, 1950

2,518,263

UNITED STATES PATENT OFFICE 2,518,263

ADJUSTABLE SHAFT MOUNTING MEANS

Donald W. Aabel, East Moline, Ill., assignor to International Harvester Company, a corporation of New Jersey Application August 3, 1946, Serial No. 688,367

1 Claim. (Cl. 308—59)

This invention relates to a new and improved spring mounting for threshing cylinders.

An important object of this invention relates to a threshing cylinder mounting and particularly to the provision of means for yieldably maintaining the cylinder in cooperative relationship with a concave.

Another important object of the invention is to provide spring means associated with a threshing cylinder for applying a uniform yieldable force over the entire cylinder to effect more efficient grain threshing.

A further object of this invention is the provision of means for permitting the threshing cylinder to yield vertically upon the attempted passage of a large slug of material or some foreign object which would cause breakage of the elements.

A still further object of this invention is to provide a quickly releasable manual mechanism for raising the threshing cylinder from the concave and eliminating all downward spring pressure on the cylinder.

Still another object of this invention is to provide parallel spring means for causing uniform yieldable force to be applied to the threshing cylinder.

A further object of this invention is to provide a leaf spring for creating uniform force on the threshing cylinder in a manner similar to that of the parallel spring means.

Other and further important objects of this invention will become apparent from the disclosures in the following specification and accompanying drawings, in which:

Figure 1 is a side elevational view showing one form of spring mounted threshing cylinder of this invention;

Figure 2 is a sectional view taken on the line 2—2 of Figure 1;

Figure 3 is a front elevational view of a modified form of spring-mounted threshing cylinder; and Figure 4 is a sectional view taken on the line 4—4 of Figure 3.

As shown in the drawings:

Reference numeral 10 indicates generally a side sheet of a threshing machine which may be either stationary or may be of the harvester-thresher type which runs through the fields of standing grain and cuts and threshes the grain at the same time. The thresher body or housing is relatively long and narrow and has a pair of side sheets 10', each having an aperture in transverse alinement with the other, between which a threshing cylinder 11 is positioned. The side sheet apertures are enclosed by cover plates 12.

The threshing cylinder 11, as shown in Figure 2, comprises a supporting shaft 13, a hub member 14 surrounding the shaft 13, radially extending wheel-like members 15, and rub bars 16 riveted or otherwise attached to the wheel-like members 15 at 17. The rub bars 16 are positioned transversely and in parallel relationship with the central supporting shaft 13. Figure 2 of the drawings shows one side of the threshing machine and the mounting of the cylinder supporting shaft 13. The far side, not shown, of the machine is identical to the portion shown.

The threshing cylinder in cooperation with a concave 18 acts to separate the grain from the straw and trash. For various types of grain it is obvious that the position of the rub bars with respect to the concave must be varied. Heretofore threshing cylinders have been rigidly mounted in the threshing machine with concave spacing adjustment very difficult to accomplish. The present invention facilitates cylinder adjustment and, in addition, provides a yieldable mounting so that the cylinder will automatically accommodate various types as well as various sizes of grain. The cover plates 12 are bolted to the side walls 10 of the threshing machine at 19 on the upper side and at 20 on the lower side. The bolts 20 serve to carry the concave in addition to holding the cover plate in position against the side of the thresher.

A bracket 21 is bolted to the cover plate 12 at 22. Vertical elongated slots 23 are provided in the bracket 21 to permit vertical slidable movement of the bracket with respect to the cover plate 12. The bracket 21 is a flat plate and is outlined by vertical sides 24, a top 25, and a bottom 26. The bracket 21 has outwardly extending flanges 27. A central plate 28 has outwardly turned side flanges 29 adjacent the flanges 27 and carries a bearing 30, shown here as a ball bearing, which journals the cylinder supporting shaft 13 therein. This ball bearing 30 has a housing 30' which is riveted to the plate 28 by rivets 30''. The plate 28 is adapted to slide vertically within the flanges 27 on the bracket 21. Coil springs 31 are positioned between outwardly extending channel shaped projections 31' which are welded to the top 25 of the plate bracket 21 and an outwardly turned flange 32 at the lower edge of the plate 28. The springs 31 tend to push the plate 28 downwardly and thus indirectly push the threshing cylinder 11 down against the concave 18. The springs 31 are carried about spaced vertical bolts 33 and 33'. The upper bolt 33 has nuts 34 and 35 at the top thereof for varying the compression of the coil springs. Nuts 36 at the lower end of bolts 33' and beneath the flange 32 abut a flange 37 projecting outwardly from the lower edge 26 of the plate 21, thus limiting the downward movement of the cylinder with reference to the concave 18. This minimum spacing between the cylinder and concave must be adjusted by spreading the pair of nuts 36 so that greater space is provided between the vertically spaced flanges 32 and 37. This would, of course, correspondingly space the cylinder farther from the concave.

If it is desired to raise the cylinder in order to clean out a slug, four nuts 38 on the bolts 22 are slightly loosened and a hand lever 39 is pulled outwardly so that the spaced parallel arms 40 swing about their pivotal connection 41 on the lower cross member 26 of the member 21. A stationary block 42 welded to the cover plate 12 is positioned between the arms 40 and comprises a lock for a cross piece 43 joining the lower ends of the arms 40. The hand lever 39 has an upwardly extending projection 44 which is adapted to engage a socket within the stationary block 42. The cross piece 43 is pivotally joined to the arms 40 at 45 and carries the hand lever 39. A lock nut 46 threadedly engages the hand lever 39 and is adapted to be drawn up against the bottom of the cross piece 43. This lever mechanism is commonly called an over-center locking device. In operation, the lock nut 46 is turned downwardly and the hand lever 39 is pulled outwardly thus causing the cross piece 43 to pull out from beneath the stationary block 42 and permitting the entire bracket 21, including the plate, with the threshing cylinder 11 to be moved upwardly a distance equal to the length of the slots 23. In this manner the machine can be cleared of any large slugs of material that have caused jamming. In order to resume operation of the threshing machine, the handle 39 with its cross piece 43 is swung downwardly around the bottom of the stationary block 42 so that the upper projection 44 of the handle 39 engages the notch in the block 42. The handle 39 is preferably swung against the side sheet 10 of the threshing machine so that it constitutes an over-center locking which prevents release of the threshing cylinder at any time except when desired.

In normal operation of a threshing machine the cylinder 11 is held under an even pressure by reason of the four coil springs 31 spaced in the four corners of the device. When greater amounts of material are passed through the threshing machine, the cylinder will raise as required against the action of the springs 31. The bearing 30 and its housing 30' move upwardly through an elongated slot 47 in the side sheet and cover plates 10 and 12 respectively. By using four springs, the cylinder need only raise on the side or corner where the excessive amounts of material are present, and in this manner lesser quantities of grain which are fed to other corners or portions of the threshing cylinder and concave will be threshed as efficiently as the grain coming in in large quantities.

The modified thresher cylinder mounting as shown in Figures 3 and 4 is identical to the device shown in Figures 1 and 2 with the exception of the spring means for applying downward force on the cylinder. A bracket 21' similar to bracket 21 has vertical sides 24'. The sides 24' have outwardly turned flanges 48. These flanges 48 are similar to the flanges 27 shown in Figure 1 but are considerably longer. The top 49 of the bracket 21' is equipped with an outward projection 50 which may be integral with the bracket 21' or may be welded as shown at 51 across the top 49 of the plate like bracket 21'. A plate 52 carrying a bearing 70 and its housing 70' corresponds to the plate 28 in the device as shown in Figures 1 and 2 and the bearing 30. The plate 52 has outwardly extending side projections 53 welded at 54 to the plate 52 and here again these projections may be formed as a part of the plate 52. A leaf-type spring 55 is guided at its central portion 56 by a pin 57 projecting down through the top member 50 and through an aperture in the leaf spring 55. An adjustable stop 58 consists of a lug 59 welded at 60 to the cross piece 49 and has a vertically positioned bolt 61 threadedly engaging an aperture in the lug 59. A centrally positioned projection 62 in horizontal alinement with the projections 53 is welded at 63 to the plate 52.

In operation, material is passed through the threshing machine, and when there is sufficient quantity to overcome the action of the leaf spring 55, the cylinder 11 is raised with the plate 52, the side projections 53 contacting the downwardly curved ends 64 of the leaf spring 55 thereupon causing the spring 55 to straighten out. Upward movement of the cylinder 11 is limited by the centrally positioned projection 62 striking the lower end of the bolt 61 on the stop member 58. It is apparent that the amount of travel of the plate 52 may be limited by adjustment of the bolt 61 with respect to its stationary support 59. The lower limit of the plate 52 is fixed by a stop member 65 welded at 66 to the lower edge of the bracket 21' corresponding to the lower cross member 26 of the device as shown in Figures 3 and 4. The plate 52 is equipped with upwardly extending side flanges 67 corresponding to the side flanges 29 of the plate 28. The plate 52 and its side flanges 67 slide vertically within the flanges 48 of the bracket 21'. The leaf spring 55 having its central portion anchored and its ends 64 acting downwardly against the sides of the plate 52 corresponds to the separate coil springs 31 as shown in the device in Figures 1 and 2. Both modifications have the principle of uniform spring action against the threshing cylinder and yet permit any part of the cylinder to raise independently of another part in order to efficiently thresh grain.

Numerous details of construction may be varied throughout a wide range without departing from the principles disclosed herein, and I therefore do not propose limiting the patent granted hereon otherwise than as necessitated by the appended claim.

What is claimed is:

In a shaft mounting means within a housing having spaced side walls, brackets adjustable vertically on said housing side walls, said brackets having vertical slots therein, bolt means fixed to said housing walls and projecting through said slots, nut means for engaging the bolt means when the brackets are in any relative position with respect to said housing walls, said brackets arranged and constructed to carry a shaft, hinged lever means mounted on said brackets, and socket blocks on said housing for lockingly receiving said hinged lever means, whereby each of said brackets may be raised or lowered after loosening of said nut means and raising of said hinged lever means away from the socket blocks.

DONALD W. AABEL.

(References on following page)

REFERENCES CITED

The following references are of record in the file of this patent:

UNITED STATES PATENTS

| Number | Name | Date |
|---|---|---|
| 1,151,858 | Brock | Aug. 31, 1915 |
| 1,172,011 | Cooper | Feb. 15, 1916 |
| 1,709,018 | Howson | Apr. 16, 1929 |
| 2,318,188 | Anderson et al. | May 4, 1943 |
| 2,334,944 | Millard et al. | Nov. 23, 1943 |
| 2,310,282 | Gauss | Feb. 9, 1943 |
| 2,376,618 | Paradise et al. | May 22, 1945 |

FOREIGN PATENTS

| Number | Country | Date |
|---|---|---|
| 16,489 | France | Sept. 19, 1856 |
| 26,917 | Germany | May 14, 1884 |